Aug. 4, 1964    L. D. GOLDEN    3,143,628
TWO TURN INDUCTOR BLOCK WITH INTEGRAL QUENCH
Filed Dec. 11, 1961
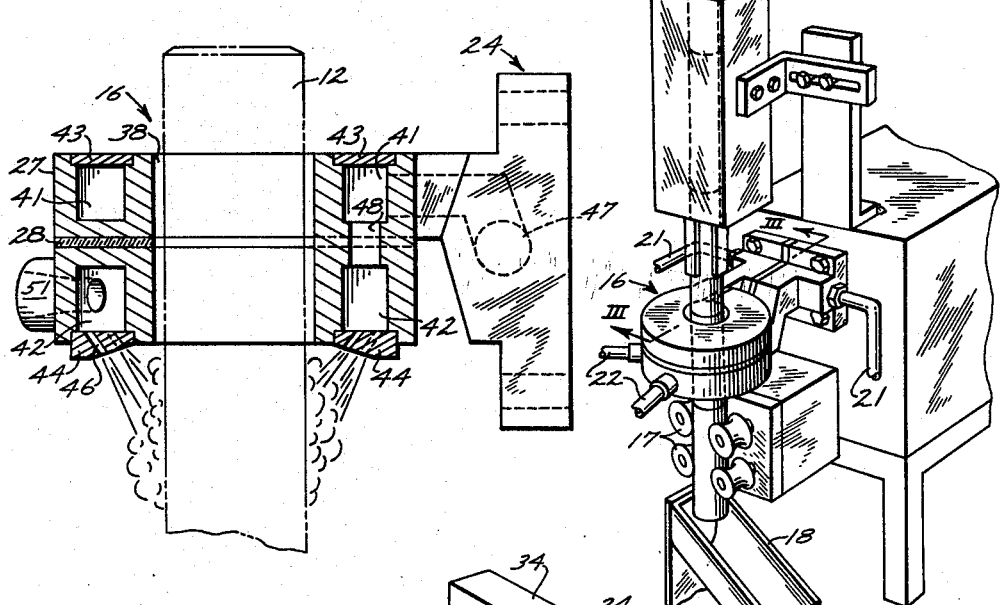
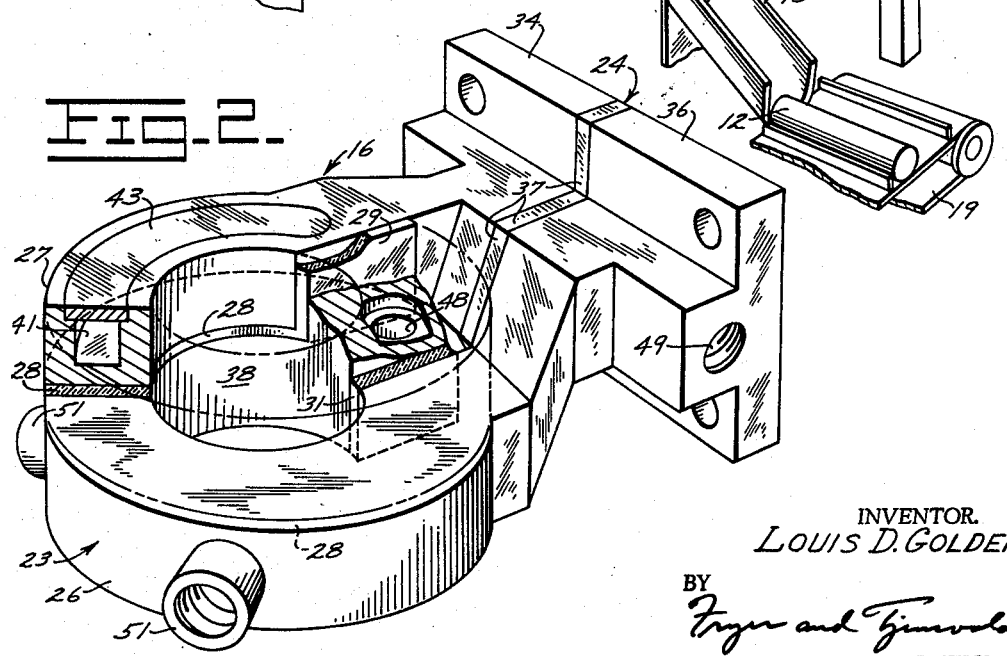
INVENTOR.
LOUIS D. GOLDEN
BY
ATTORNEYS

United States Patent Office 3,143,628
Patented Aug. 4, 1964

3,143,628
TWO TURN INDUCTOR BLOCK WITH INTEGRAL QUENCH
Louis D. Golden, Mapleton, Ill., assignor to Caterpillar Tractor Co., Peoria, Ill., a corporation of California
Filed Dec. 11, 1961, Ser. No. 158,201
2 Claims. (Cl. 219—10.49)

The present invention relates to induction heating apparatus and more particularly to induction heating apparatus for heat treating metallic work pieces and providing a quench media therefor.

The use of induction heating for the treatment of metal objects is a method well known in the art. By creating a high density magnetic flux field and passing a metallic object therethrough, the object can be quickly and accurately heat treated in a convenient manner. One well known method of induction heating employs a large toroidal conductor supplied with a high frequency current of large magnitude from a transformer. The toroidal conductor acts as a single turn inductor, and produces a flux field within its central opening in response to current flowing around its circumference. When a metal object is introduced into the central flux field, it receives energy from the flux field which generates heat in the object. The higher the temperature required to treat an object introduced into the flux field, the higher must be the energy contained in the central flux field. Since the energy in the flux field increases with increased flux densities, it is desirable to be able to produce high density magnetic flux fields. Higher density flux fields are generally produced in one or two ways; either by increasing the magnitude of the current to the flux producing inductor, or increasing the number of turns of the inductor.

In practice, it has been found that the limiting factor in achieving high temperatures by induction heating is the rating of the transformer which supplies the flux producing inductor with current. The highest temperatures which can be obtained through induction heating with a large single turn inductor supplied with current from an industrial size transformer have, for many purposes, proven to be insufficient. One specific example of where the temperatures obtainable from induction heating have not been as high as desired is in the heat treating of tractor track pins, and the like. In order to provide as much induction heating as possible, transformers providing current are often operated above their rated values with danger of damaging the transformer. The cost of repairs as well as loss due to machine down time makes such operation undesirable.

Thus it is desirable to have a toroidal flux producing fixture which can provide high density fields when supplied with current from transformers operated at, or below, their rated value. Such a fixture enables high temperature heat treatment without failures and down time. It also allows heat treating at normal temperatures to be conducted at a faster rate. The present invention is a toroidal flux producer as described above, provided by a novel two turn toroidal inductor.

It is the general practice for certain induction heating applications, to water cool the single turn inductor and utilize the same water as a quenching media for the objects being heat treated. The present invention provides an integral quenching media which also serves to cool the flux producing apparatus in a two turn inductor.

Accordingly, it is an object of the present invention to provide induction heating apparatus capable of satisfying high temperature heating requirements while being supplied with energy from a commercially available transformer operating within its rated values.

It is another object of the present invention to provide a two-turn inductor formed from a single piece of electrically conducting material requiring no welded or similar connections which could create undesirable hot spots.

It is another object of the present invention to provide a two-turn induction heating coil constructed from a single piece of electrically conducting material which is effectively water cooled and which provides an integral quench means.

Further and more specific objects and advantages of the invention are made apparent in the following specification wherein a preferred form of the invention is described by reference to the accompanying drawing.

In the drawing:

FIG. 1 is a generally schematic view of a portion of an assembly line wherein the present invention is used for the heat treatment of cylindrical track pins or the like;

FIG. 2 is an isometric view of the two-turn induction coil of the present invention with portions broken away and portions shown in phantom to more clearly illustrate its structure; and FIG. 3 is a sectional view of the invention taken along the line III—III of FIG. 1.

Referring now to FIG. 1, a conveyor means 11 delivers track pins 12, or similar metal objects, to a delivery chute 13 from which they enter a suitable guide means 14. From guide 14, the pins pass through induction heating fixture 16 where they are heat treated and quenched in a prescribed manner. After being heat treated and quenched, the pins are guided and driven by rollers 17 to a second delivery chute 18 from which they pass to a second conveyor 19. The rate at which the pins pass through the induction heating fixture 16 is determined by the rate at which rollers 17 operate, and the rate at which the rollers operate is made adjustable to suit the various requirements presented by work pieces of differing character.

Cooling and quench water is supplied to the induction fixture by means of pipes 21 which are connected to a supply of water or other quench media (not shown). When the requirements for quenching are greater than can be met by fluid supplied through pipes 21, auxiliary pipes 22, which are also connected to fixture 16, are employed to provide added quenching media to the fixture.

Referring now to FIG. 3, induction fixture 16 is seen to comprise a generally toroidal portion 23 and bracket portion 24 integrally connected thereto. Fixture 16 is formed from a single casting or machined from a single billet of metal to eliminate the necessity of welding or, in some similar manner, securing one part of the fixture to the other. This is important since the presence of a metallic discontinuity in the structure which would be presented by a welded joint would introduce resistance which would become a "hot spot" when the high flux producing currents were forced to pass therethrough. The heat dissipated in these metallic discontinuities would be sufficient to eventually destroy the connection as well as reduce the amount of energy contained in the flux field. Consequently, while fixture 16 is referred to as having a toroidal portion 23 and a bracket portion 24, it is to be understood that these portions of the fixture are truly integral and are given separate designations only for the purpose of better describing the invention.

Toroidal portion 23 of fixture 16 has a lower coil 26 and an upper coil 27 separated by an annular shaped insulating member 28 forming less than a complete circle and disposed in a slot formed in portion 23. A first generally rectangular insulating member 29 having the same width as insulating member 28 is disposed in a radial slot formed in portion 23, thereby being vertical with respect to the plane of member 28 and is connected at one end thereof. Insulating member 29 extends between the outer planar surface of coil 27 and insulating member 28. A second generally rectangular insulating member 31, also of the same width as member 28, is disposed in a radial slot formed in portion 23, thereby being vertical with respect to the plane of member 28 and at the other end thereof. Insulating member 31 extends between the outer planar surface of coil 26 and member 28. Insulating member 28 forming less than a complete circle has ends disposed at a distance from each other. Since insulating members 29 and 31 are positioned at the ends of member 28, they too are disposed at a distance from one another. In the small space between members 29 and 31 coil 27 and coil 26 are integral and in electrical communication.

Bracket 24 is electrically separated into a terminal 34, which is integral with coil 27, and a terminal 36, which is integral with coil 26, by means of an intervening insulating member 37. Insulating member 37 is aligned with and connected to insulating member 31. Insulating members 28, 29, 31 and 37 are positioned in slots machined into fixture 16 and are preferably formed from insulating material of high quality such as mica.

The particular placement of the various insulating members described above requires that current supplied to terminal 34 travels counter clockwise around coil 27 to the point where it is interrupted by insulation 29, thence downwardly to coil 26 and around coil 26 to insulation 31 out through terminal 36. If current is supplied at terminal 36 the current path followed would be exactly reversed from that just described. Thus, whether current is supplied at terminal 34 or 36 the path which it follows in traveling to the other terminal is identical with that followed by current passing through a two turn inductor. By providing a two turn path for the current to follow, rather than the conventional single turn path, fixture 16 is able to produce a magnetic flux field within the central opening 38 of toroidal portion 27, of approximately twice the density which would be produced by a comparable single turn inductor supplied with a like source of current. The provision of a higher density flux field allows for heat treatment at higher temperatures than capable with conventional toroidal inductors or faster heat treatment at normal temperatures.

Because of the current magnitudes involved and the high frequency of these currents, fixture 16 is itself heated through resistive dissipation and eddy currents, requiring a fixture cooling means. Fixture 16 is provided with a coolant channel system which provides effective cooling as well as a source of quenching media to be applied to a work piece as it passes through opening 38.

The structure provided for circulating coolant through coils 27 and 26 and expelling that coolant so as to provide a quenching media for a work piece being treated will be described with reference to FIGS. 2 and 3.

Each of coils 26 and 27 is formed or machined to have a hollow central section through which coolant is circulated to prevent fixture 16 from overheating. The hollow central sections are formed as open grooves which are covered with caps to form enclosed channel 41 in coil 27 and enclosed channel 42 in coil 26. Cap 43 enclosing channel 41 prevents any fluid from escaping while cap 44 enclosing channel 42 is provided with orifices 46 to allow the circulating coolant to pass out of channel 42 in the form of a spray. The spray impinges upon and quenches a work piece passing through the central opening 38 of the fixture.

The coolant which flows into terminal 34 and around coil 27 follows the same path as does current which enters terminal 34. Thus duct 47 (FIG. 3) in terminal 34 is provided to receive coolant from pipe 21 and delivers it to channel 41 in coil 27. Channel 41 initiates at, and receives coolant from, duct 47 at a position close to insulating member 29 and on the side thereof where coil 27 is separated from coil 26 by insulating member 28. Channel 41 extends counter clockwise around coil 27 to a position in close proximity to the other side of insulating member 29 where a transfer port 48 connects channel 41 with channel 42 of coil 26. Thus coolant which enters duct 47 in terminal 34 circulates around coil 27 approximately one revolution after which it passes into lower channel 42 and through orifices 46. A duct 49 in terminal 36, similar to duct 47 in terminal 34 also receives coolant from a pipe 21. The fluid supplied to duct 49 is delivered directly to channel 42 with which it communicates. The coolant supplied to channel 42 through duct 49 circulates through the channel and issues through orifices 46. When the quantity of coolant supplied through ducts 47 and 49 is not sufficient to provide the necessary quantity of quenching media required, additional quenching media can be supplied directly into channel 42 through fixtures 51 in communication therewith.

With terminal 34 connected electrically to one of the output terminals of a transformer (not shown) and terminal 36 connected to the other output terminal of the transformer, fixture 16 is capable of conducting heat treatment operations requiring work pieces to be elevated to very high temperatures. And most important, these temperature treatments can be conducted without the necessity of operating the transformer in excess of its rated limits. The present invention thus provides an induction heating fixture and supply which is relatively maintenance free as compared to like apparatus presently known in the art.

I claim:
1. In an induction heating fixture for producing a flux field when supplied with electrical current the combination comprising;
  a torodial metal coil member having an upper planar surface and a lower planar surface;
  an annular shaped insulator forming less than a complete circle and thereby having two ends, said insulator disposed in a circumferential slot formed in said coil member and electrically separating said member into an upper and lower coil;
  a first radial insulator having a width generally equal to the difference between the inner and outer diameter of said toroidal member, said insulator in a radial slot formed in said coil member between one end of said annular insulator and the upper plannar surface;
  a second radial insulator having substantially the same width as said first radial insulator, said second insulator in a radial slot formed in said coil member between the other end of said annular insulator and the lower plannar surface;
  a metal bracket member integral with said toroidal member; and
  a generally plannar insulator member disposed in a slot formed in said bracket member and electrically subdividing it into a first terminal and a second terminal, said first terminal electrically connected to the upper coil only, said second terminal electrically connected to the lower coil only.

2. The induction heating fixture of claim 1 further described by:
  said upper coil having a fluid channel formed therein extending from a position near said first radial insulator around said upper coil to a position between the ends of said annular insulator;

said lower coil having a fluid channel formed therein extending from a position between the ends of said annular insulator around lower coil to a position near said second radial insulator;

a tube located between the ends of said annular insulator connecting the upper and lower coil channels;

the first terminal having a duct therein communicating at one end with the channel of the upper coil and a source of coolant at its other end;

the second terminal having a duct therein communicating at one end to the lower coil channel and at its other end to a source of coolant; and the lower planar surface having a plurality of flow passages cricumferentially disposed and providing means for coolant in the lower coil channel to escape and provide a quench media.

References Cited in the file of this patent

UNITED STATES PATENTS

| | | |
|---|---|---|
| 2,459,894 | Powell | Jan. 25, 1949 |
| 2,459,971 | Stanton | Jan. 25, 1949 |
| 2,689,296 | Sabol | Sept. 14, 1954 |
| 2,866,880 | Miller | Dec. 30, 1958 |

FOREIGN PATENTS

| | | |
|---|---|---|
| 479,024 | Belgium | Nov. 3. 1950 |